United States Patent [19]
Matsuoka et al.

[11] Patent Number: 6,104,451
[45] Date of Patent: Aug. 15, 2000

[54] THIN DISPLAY HOUSING WITH MULTIPLE CHAMBERS AND FANS

[75] Inventors: Katsumasa Matsuoka, Kodaira; Yoshiaki Amano, Tama; Tatsuo Murai, Sagamihara; Taisuke Kashima, Urawa; Hisayuki Ishii, Hadano; Tatsumi Mori, Isehara; Naohiro Takasugi, Kanagawa-ken, all of Japan

[73] Assignee: Hitachi, Ltd., Tokyo, Japan

[21] Appl. No.: 09/267,595

[22] Filed: Mar. 15, 1999

[30] Foreign Application Priority Data

Mar. 16, 1998 [JP] Japan .................................. 10-064961

[51] Int. Cl.⁷ ................................................. G02F 1/1333
[52] U.S. Cl. .................................. 349/58; 349/59; 349/60; 361/681; 361/682
[58] Field of Search ................................. 349/58, 59, 60; 361/681, 682

[56] References Cited

U.S. PATENT DOCUMENTS

| | | | |
|---|---|---|---|
| 5,363,227 | 11/1994 | Ichikawa et al. | 359/83 |
| 5,831,816 | 11/1998 | Johns et al. | 361/681 |
| 5,867,148 | 2/1999 | Komimaki et al. | 345/169 |
| 6,008,870 | 12/1999 | Yun | 349/58 |

FOREIGN PATENT DOCUMENTS

| | | |
|---|---|---|
| 9-238293 | 9/1997 | Japan . |
| 9-274444 | 10/1997 | Japan . |
| 1002223 | 2/1998 | Japan . |

*Primary Examiner*—Kenneth Parker
*Assistant Examiner*—Mike Qi
*Attorney, Agent, or Firm*—Mattingly, Stanger & Malur

[57] ABSTRACT

A large thin display unit has a chassis structure with a first horizontally or vertically disposed enclosure, a second vertically extending enclosure mounted to the upper side of the first enclosure, and a third vertically extending enclosure mounted above the first enclosure behind the second enclosure. The second enclosure has an opening that opens toward a front of the unit and has a margin along the perimeter of the opening. The thin display section is fixed to the margin in a vertical position. Further, an air route is formed between the third enclosure and a planar portion of the second enclosure, and an air route is formed between the thin display section and the planar portion of the second enclosure. Also, a wiring space is formed between the thin display section and the planar portion of the second enclosure. Preferably, the thin display section is a large liquid-crystal display provided with a plurality of backlights.

10 Claims, 12 Drawing Sheets

THIN DISPLAY HOUSING WITH MULTIPLE CHAMBERS AND FANS

FIELD OF THE INVENTION

The present invention relates to a thin display unit that receives picture signals supplied from an external unit and in particular to a thin display unit such as a liquid-crystal display provided with a backlight or a plasma display that receives picture signals and displays an image.

BACKGROUND OF THE INVENTION

Because a thin display unit, such as a liquid-crystal or plasma display, is thin and lightweight compared to a CRT display, it is widely used with portable computers such as notebook-type personal computers or portable terminals.

In particular, because of recent technical innovations, it is possible to manufacture liquid-crystal display units having a large display screen or a high-resolution LCD (Liquid-Crystal Display) unit at a low price. Accordingly, thin display units are likely to be widely used for desk-top personal computers and terminal processors. A typical thin display unit used with desk-top computers has a body provided with a liquid-crystal display unit and a stand for supporting the body so that it can be tilted.

A specific example of a conventional thin display unit is disclosed in Registered Design No. 1002223.

SUMMARY OF THE INVENTION

A conventional thin display unit has a structure in which a thin iron plate is used as the support member of the body and a liquid-crystal unit is secured to the front of the support structure member by screws. However, problems have resulted with this structure when used in recent thin display units having a large display screen. One problem is that the conventional structure is subject to being broken due to twisting because the unit is very thin. A further problem has resulted from an increase in weight due to an increase in display unit size. Therefore, a thin display unit having a thin structure that has high strength is in demand.

Yet another problem with liquid-crystal display units is that a backlight is provided at its back side, so a large amount of heat is produced. Particularly in the case of a high-resolution liquid-crystal display that has gained interest recently, a plurality of backlights are arranged at the back. Therefore, dissipation of the heat produced by the backlights and the heat produced by the circuit for driving the backlights poses a problem.

In the case of the above mentioned large LCD, it is also important to shield radio waves produced by the liquid-crystal display and control circuit while maintaining structural strength, while considering the significance of decreasing the weight of the unit. Still further, display units that are multimedia-compatible and that can be connected with an AV unit or other units are in demand. Thus, for a high-resolution LCD, the provision of various input/output terminals must be considered in order to accommodate various types of applications such as three-dimensional computer graphics (CG). Thus, it must be expected that an LCD will be connected with many other peripheral units and thus, the wiring processing can present a problem.

It is an object of the present invention to provide a thin display unit having a structural body suitable for large thin displays, such as a liquid crystal display unit.

To achieve the object, the body of a thin display unit of the present invention preferably has a horizontally or vertically disposed first enclosure, a vertical second enclosure located at the front of the first enclosure, and a vertical third enclosure located above the rear of the first enclosure and at the rear of the second enclosure. Preferably, a second unit-storing section opens to the front by forming a margin around the front of the planar portion of the second enclosure, the second enclosure being formed so as to vertically store a thin display section in the second unit-storing section.

Preferably, the thin display unit of the present invention has a stand separate from the body having a base and a tilting mechanism, and according to a preferred embodiment of the invention, the thin display unit is a liquid crystal display unit having at least one backlight.

Further, preferably, the thin display unit of the present invention has a power supply section disposed in one of a predominantly horizontal orientation or a predominantly vertical orientation corresponding with the orientation of the horizontally or vertically disposed first enclosure. Further, the first enclosure preferably has a step and the second enclosure is preferably is mounted to the first enclosure at the front thereof using the step as a support structure.

Still further, the thin display unit of the present invention preferably has ventilation ports for taking in fresh air that flows upwardly through the first, second and third enclosures that is exhausted out the cover of the unit, wherein a natural flow of radiated heat is maintained through the vertical second enclosure and wherein at least one exhaust fan is optionally provided for assisting in maintaining the air flow through either or both of the first and second enclosures.

According to a preferred embodiment of the invention, the first enclosure of the body of the thin display unit has a first unit-storing section made of a conductive material for storing the power supply section, the second enclosure has a second unit-storing section made of a conductive material to vertically store the thin display section at the front of the planar portion of the second enclosure, and the third enclosure is located to form a wiring space between the third enclosure and a wide planar portion of the second enclosure and moreover has a third unit-storing section made of a conductive material for storing a vertically disposed substrate.

Figure 11A:
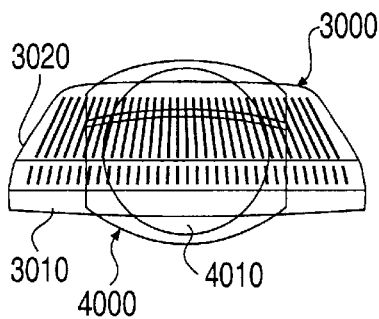
Figure 11B:
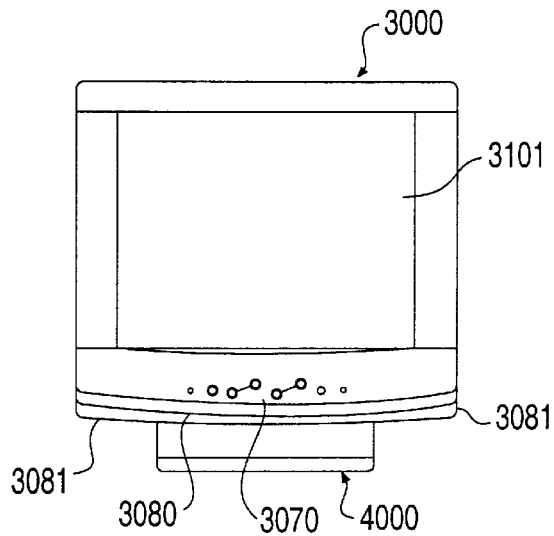
Figure 11C:
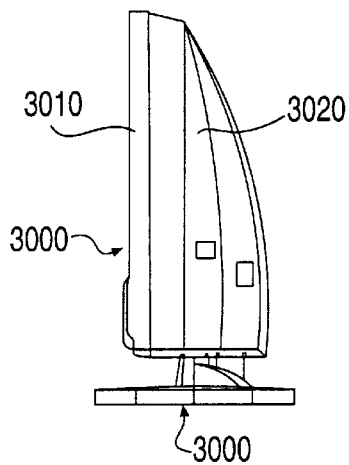
Figure 11D:
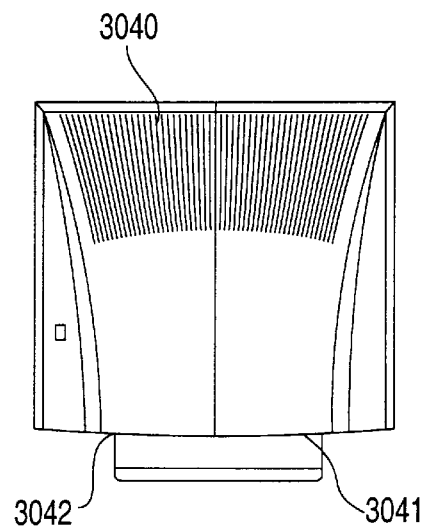
Figure 12:
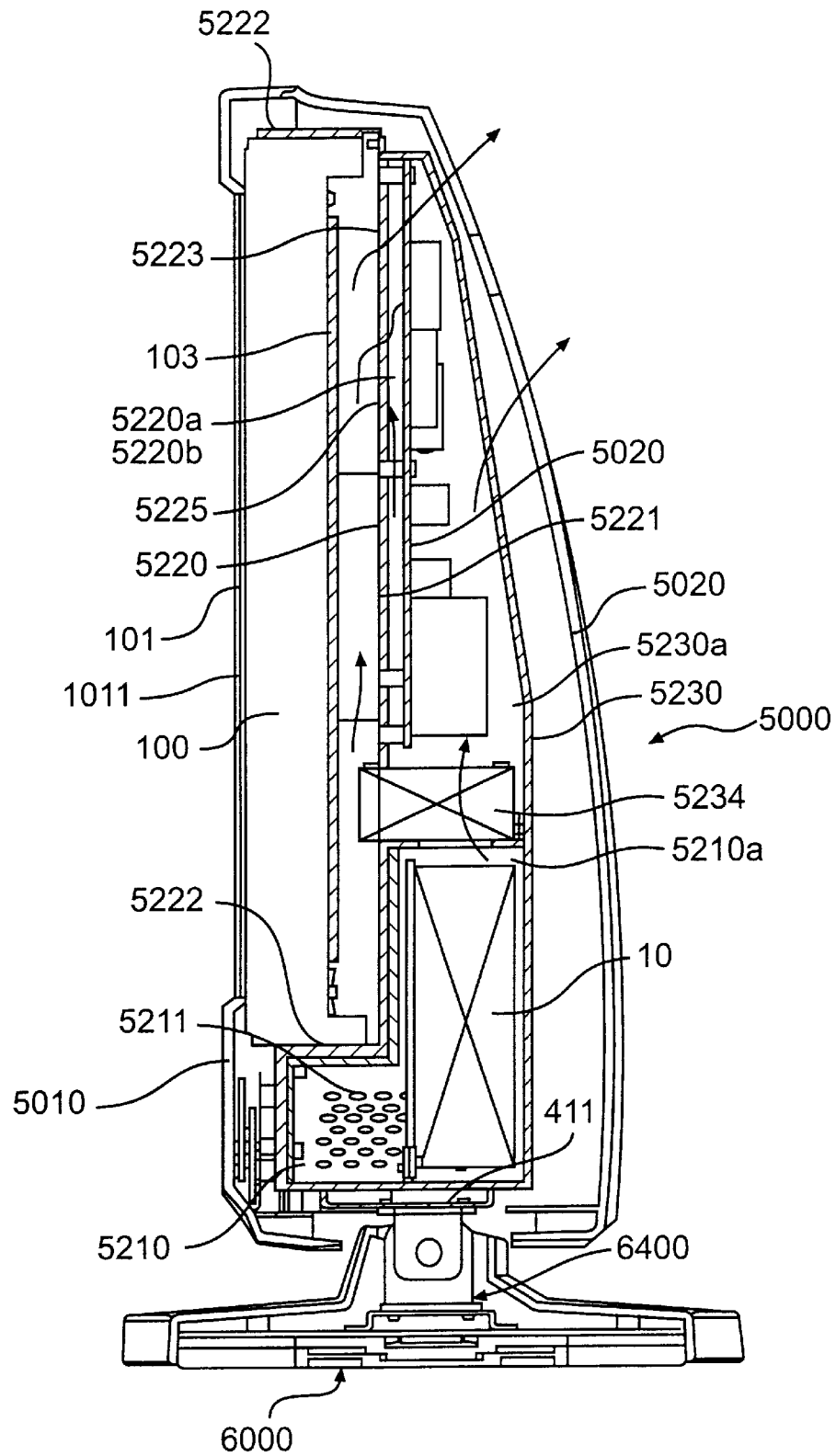

are diagrams of screen displays associated with the operation and layout of the operation switches;

FIGS. 11(a) to 11(d) are top, front, side and back views, respectively, of an LCD according to a second embodiment of the present invention; and FIG. 12 is a central longitudinal sectional view of an LCD according to a third embodiment of the present invention.

DETAILED DESCRIPTION OF THE PREFERRED EMBODIMENTS

First Embodiment

The first embodiment of the present invention is described by referring to FIGS. 1 to 10. In particular, a schematic structure of an LCD unit that is of the first embodiment of the present invention is shown in a central longitudinal sectional view of the LCD, generally designated 1.

The LCD has a body 1000 provided with a liquid-crystal unit 100 and a stand 2000 for movably supporting the body 1000. LCD 1 receives picture signals from an external unit and reproduces them as an image. The LCD of this embodiment is preferably connected to a processor (not shown) for executing various programs, such as a personal computer that has other input/output units such as a keyboard and a mouse, a printer, and an external storage system. Moreover, the liquid-crystal unit 100 of this embodiment uses a high-image-quality TFT liquid-crystal display module having an 18" large screen using thin-film transistor (TFT) technology. The TFT LCD module is suitable for various monitors including three-dimensional computer graphics (CG), effectively using a wide viewing angle, high resolution, high brightness, and low reflection.

The LCD of this embodiment has a connecting terminal 300 (see FIG. 2) provided with a plurality of input/output terminals at its back side. Moreover, it is possible to provide the connection terminal 300 with connection terminals that connect with an AV unit or other unit that is compatible with multimedia.

The body 1000 is formed into a thin shape, the front appearance of which is almost that of a rectangle and which has a small depth. A front case 1010, preferably molded of resin, covers the front of the body and a back case 1020, also preferably molded of resin, covers the rear of the body. In the center of front case 1010, an aperture 1011 is formed having a wide planar portion about its circumference. A display screen 101 of the liquid-crystal unit 100 is mounted within the aperture 1011 so as to be exposed to the front of the LCD.

The front case 1010 and the back case 1020 are mounted on a chassis 200 constituting the framework of the thin display unit 1, preferably through screws (not shown). The chassis 200 has a horizontal first enclosure 210 having, according to the first embodiment, a depth dimension larger than its height dimension. Chassis 200 also has a vertical second enclosure 220 located at the front of the upper side of the first enclosure 210 having a wide planar portion 221 extending in the longitudinal direction, and a vertical third enclosure 230 located above the rear of the upper side of the first enclosure at the rear of the second enclosure 220. The front case 1010 includes the front of the first enclosure 210 and the second enclosure 220 and the back case 1020 includes the rear of the second enclosure 220 and the third enclosure 230.

The first enclosure 210 has a flat thin boxy shape preferably formed by bending an iron plate and includes a first unit-storing section 210a for storing a power supply section 10. The second enclosure 220 has a second unit-storing section 220a that opens forward and that has a margin 222 at the circumference of the front of the wide planar portion 221 of the second enclosure 220. The vertical liquid-crystal unit 100 is stored in the second unit-storing section. The third enclosure 230 has a third unit-storing section 230a for storing a vertical board 20 for driving and controlling the liquid-crystal unit 100 and also for serving various interface functions.

The stand 2000 supports the body 1000 and has a tilt mechanism section 400 for longitudinally tiling the body 1000 about an axis of revolution P1. According to this embodiment, the tilt mechanism section is provided for longitudinally tilting the upper side of the body 1000 about the axis P1. Also, it is possible to use a turntable for laterally rotating the body 1000.

Figure 1:
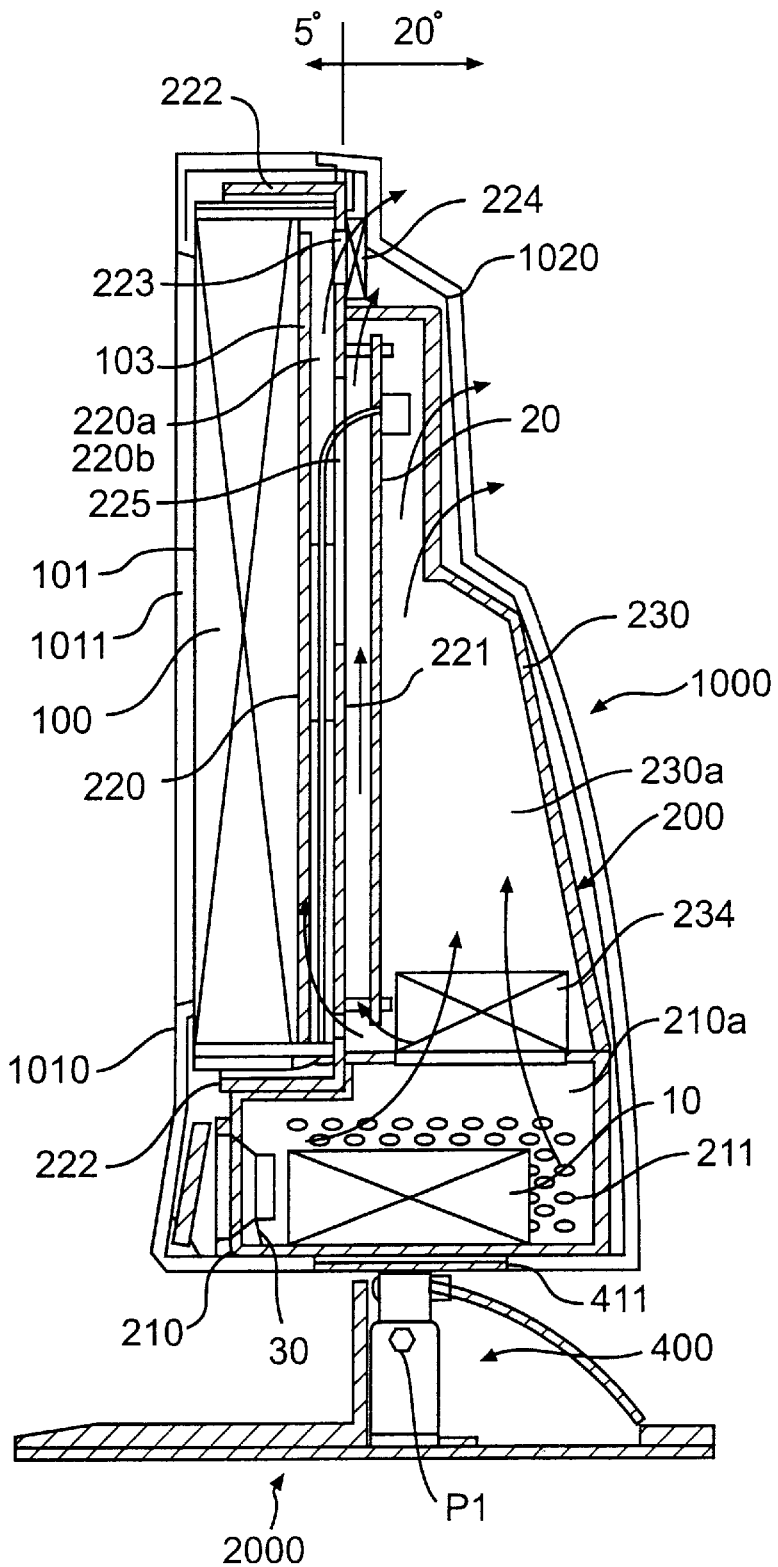
FIG. 1 is a central longitudinal sectional view of an LCD of an embodiment of the present invention.
Figure 2:
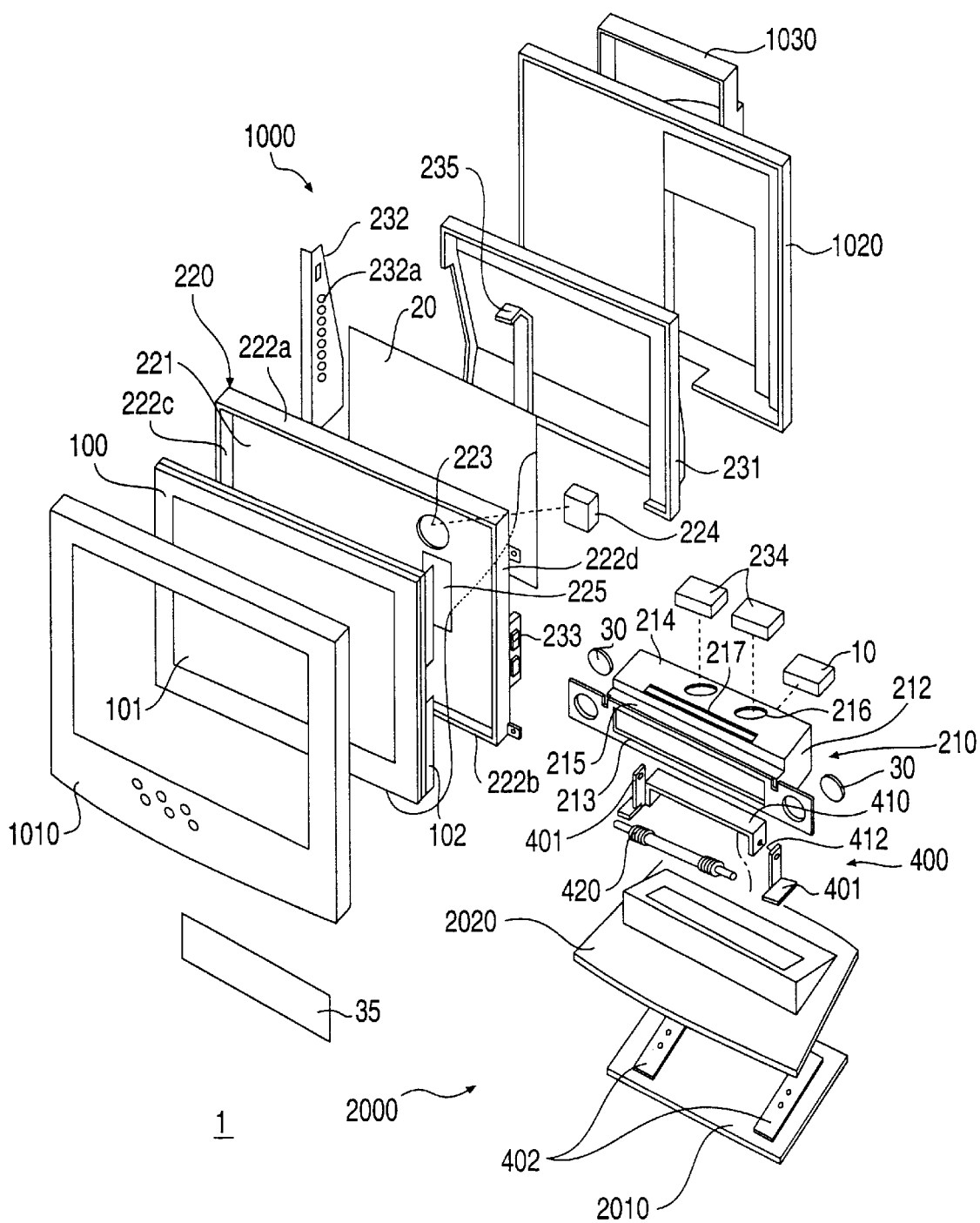
FIG. 2 is an expanded perspective view of part of the LCD shown in FIG. 1.
Figure 7:
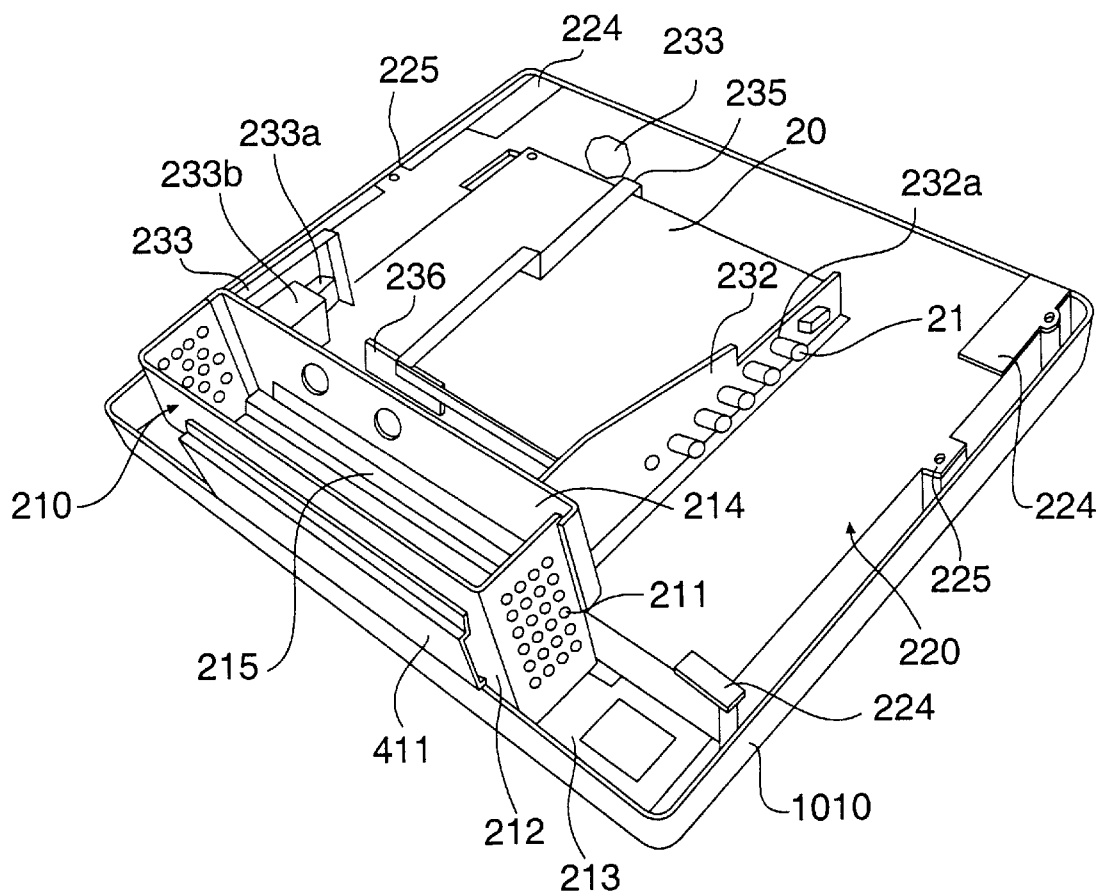
FIG. 7 is a rear perspective view with the back case and shield panel removed from the LCD shown in FIG. 1.
Figure 8:
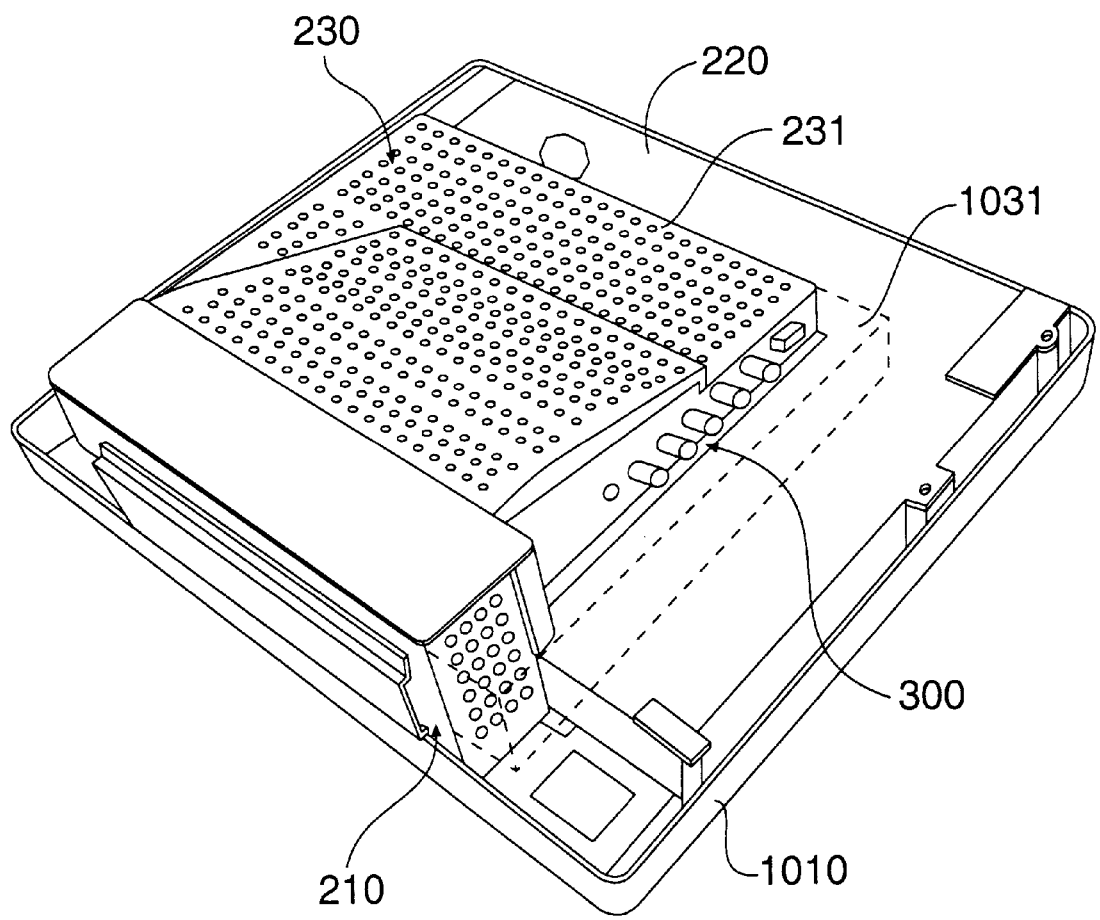
FIG. 8 is a rear perspective view with the back case removed from the LCD shown in FIG. 1.
Figure 9:
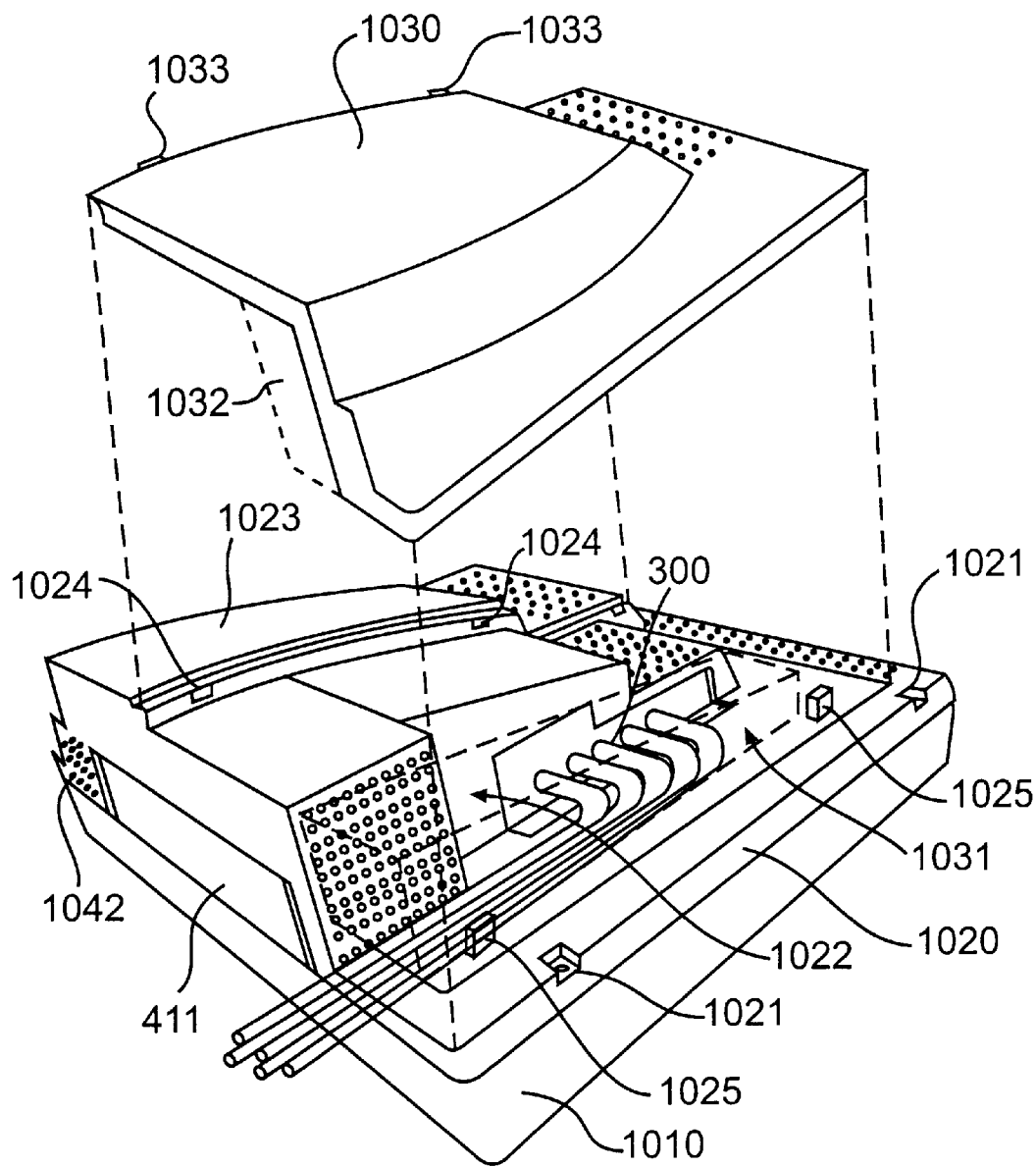
FIG. 9 is a rear perspective view of the LCD shown in FIG. 1 with the wiring cover shown in an expanded view.
Figure 10A:
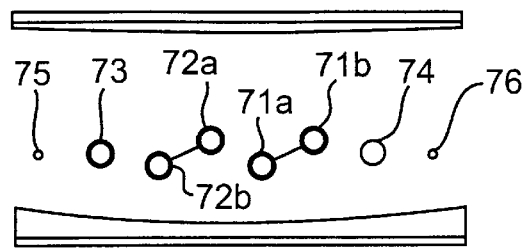
FIG. 10(a) is a diagram showing an operation switch group of the LCD shown in FIG. 1 and FIGS. 10(b) to 10(d)
Figure 10B:
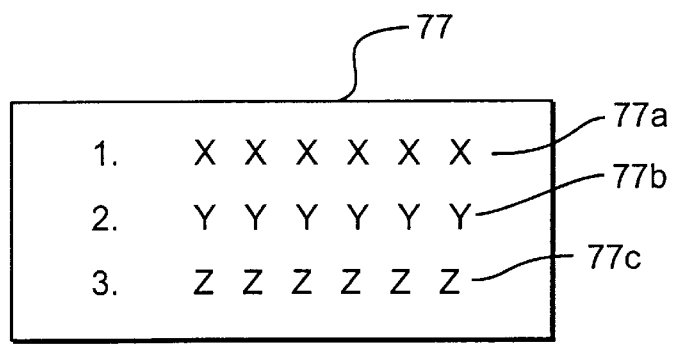
Figure 10C:
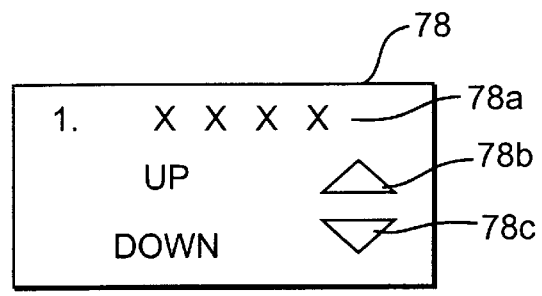
Figure 10D:
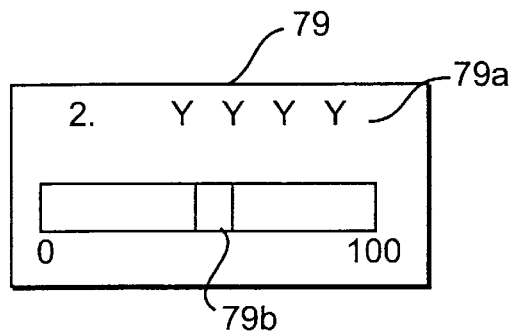

The arrangement of the parts of the LCD unit 1 are described below while referring to FIG. 1 and FIGS. 7 to 10, in accordance with FIG. 2. FIG. 2 is an expanded view of parts of the LCD unit 1. FIG. 7 is a rear perspective view with the back case and shield panel removed. FIG. 8 is a rear perspective view with the back case removed. FIG. 9 is a rear perspective view with the wiring cover removed, and FIG. 10 is a diagram for explaining a method for adjusting the LCD screen with a group of operating switches.

In FIG. 2, the first enclosure 210 serves as a framework of the support structure of the chassis 200 for supporting the second enclosure 220 and third enclosure 230. As shown in FIG. 7, the first enclosure 210 has a bottom plate 212 with wall surfaces formed by bending the bottom plate, which have a plurality of apertures 211 formed therein, a front plate 213 provided at the front of the plate 212 and having protruding portions at the sides thereof for mounting loudspeakers 30, and a top plate 214, joined by welding to plates 212 and 213 or by connecting these plates together with screws, not shown. Moreover, the back is covered with a removable shield panel 231 as shown in FIG. 8. Furthermore, the upper side of the first enclosure 210 is formed so that the front of the upper side is lower than the rear of the upper side at a stepped portion 215 and the bottom end of the second enclosure 220 is fixed to the stepped portion 215. Still further, a ventilation aperture 216 and a wiring aperture are formed in the top plate 214.

For the structure of the first enclosure 210, a plurality of plates constitute a box. Therefore, it is possible to secure support for the second enclosure 220 and the third enclosure 230 which are on or otherwise fixed to the upper side of the box. Particularly, by forming the stepped portion 215 as part of the bottom plate 212 and the front plate 213 at the front of the first enclosure 210, the heavy second enclosure 230 is firmly supported and convenient positioning during assembling is enabled. Moreover, because the rear of the first enclosure 210 includes the removable shield panel 231, it is possible to ensure convenient assembly and maintainability of the internal components, such as a power supply section 10 stored in the first unit-storing section 210a.

The second enclosure 220 is a box shaped structure disposed vertically that opens toward the front and has a wide planar portion 221, an upper margin 222a formed at the front of the portion 221, a lower margin 222b, and side margins 222c and 222d. The above structure is preferably formed by cutting out four corners of, for example, a rectangular iron plate, bending all four sides frontward, and welding each corner. This structure makes it possible to support the liquid-crystal unit 100 stored in the second unit-storing section 220a through not only the lower margin 222b formed at the bottom of the enclosure but also through the sides and the wide planar portion 221 by distributing the load to the whole of the first enclosure 220. Notably, this structure avoids the requirement of a separate reinforcement member, thereby making it possible to decrease the weight. Furthermore, it is possible to restrict the thickness (vertical dimension and lateral width dimension) of the margin portions 221a–d to the thickness of the plate. Therefore, it is possible to prevent the size of the unit from being increased by decreasing the size of the frame body around the display screen 101. Still further, this structure makes it possible to form the second enclosure 220 into a structure that resists twisting forces. Therefore, this structure is quite advantageous for a liquid-crystal unit 100 having a large display screen 101.

The liquid-crystal unit 100 is mounted to the second unit-storing section 220a from its front. The liquid-crystal unit 100 has a protrusion 102 protruding out from its back and a space 220b is formed between the back of the liquid-crystal unit 100 and the planar portion 221. As shown in FIG. 1, the space 220b provides mounting space for an inverter board 103 set at the back of the liquid-crystal unit 100. Also, the space 220b serves as a wiring space for the liquid-crystal unit 100 and the inverter board 103, a space for storing extra wiring, or a route for radiating the heat produced by the liquid-crystal unit 100 and inverter board 103.

An aperture 223 for radiating the heat produced in the second unit-storing section 220a is formed in the upper side of the wide portion 221 of the second enclosure 220. Further, because an aperture (a gap formed by a fixing rib) is formed at the lower side of the second unit-storing section 220a (FIG. 1) and since a ventilation passage communicating with the aperture 223 to radiate heat are formed, it is possible to effectively radiate the heat from the second unit-storing section 220a by means of free convection heat flow assisted by a chimney effect. To more efficiently remove the heat from the second unit-storing section 220a, forced convection is performed by mounting a blower 224 in the aperture 223. However, when the heat is sufficiently transferred by natural convection, it is unnecessary to use the blower 224.

As shown in FIG. 2, a rectangular shaped aperture 225 serving as a wiring route for connecting the second unit-storing section 220a with the third unit-storing section 230 is formed in the wide planar portion 221 of the second enclosure 220. As a result, it is possible to connect the liquid-crystal unit 100 including the inverter board 103 with the board 20 mounted in the third unit-storing section 230a via a short distance.

An operating switch board 35 (FIG. 2) and loudspeakers 30 are arranged below the second enclosure 220 at the front of the first enclosure 210. In the case of this embodiment, the operating switch board 35 is preferably mounted to a rib (not shown) formed on the back of the front case 1010. However, it is also possible to directly fix the board 35 to the front of the first enclosure 210 by screws. In this case, when fixing the board 35 to the front case 1010, matching with a switch hole formed in the front case 1010 is improved. When fixing the board 35 to the first enclosure 210, the ability to assemble and maintain the board is facilitated because no wiring is necessary for the front case 1010. Moreover, in the case of this embodiment, the operating switch board 35 is set at the center of the body 1000 and each of a pair of loudspeakers 30 is set at one side of the body 1000.

According to this embodiment, convenient manipulation of the operating switches is enabled by mounting the operating switch board 35 at an angle to vertical, which secures a wiring space for various elements behind the operating switch board 35. Furthermore, the loudspeakers 30 preferably operate in stereo and are mounted in otherwise unused, dead spaces formed at both sides of the front case 1010.

The third enclosure 230 is constituted by the wide planar portion 221 of the second enclosure 220, top plate 214 of the first enclosure 210, a terminal-setting-side plate 232 disposed to one side of the wide portion 221, a power supply switch-setting side plate 233 disposed on the other side of portion 221, and a shield panel 231 removably mounted on the wide planar portion 221.

As shown in FIG. 1, the board 20 is mounted in the third unit-storing section 230a and is set almost in parallel with the wide planar portion 221 by mounting the board with screws while leaving a space therebetween. Moreover, a blower 234 is mounted in the aperture 216 formed in the top plate 214 for separating the first unit-storing section 210a from the third unit-storing section 230a. In this embodiment, the blower 234 is mounted in the third unit-storing section 230a, which has a triangular sectional shape (as viewed from the side) and which otherwise serves as a dead space. However, it is also possible to mount the blower 234 in the first unit-storing section 210a adjacent the aperture 216.

According to this embodiment, the third unit-storing section 230a is vertically divided into two parts by forming a step at the back of the enclosure. The lower part forms a deep wide space and the upper part a shallow narrow space. The blower 234 is housed in the lower space since it has a relatively large depth dimension when mounted. Various elements mounted on the board 20 are arranged in the lower wide space also, and elements having a small depth dimensions when mounted on the board 20 are arranged in the upper narrow space. Thereby, it is possible to form the back of the thin display unit 1 in a shape in which the depth dimension stepwise decreases from the lower side to the upper side. Therefore, it is possible to have a shape with a small dead space. Moreover, because the back case 1020 for covering the third enclosure 230 is not easily seen when viewed from the front, it is possible to convey a sense of thinness to a user viewing the unit from the front.

The shield panel 231 covers the back of the first enclosure 230 and that of the first enclosure 210 at the same time. Moreover, the shield panel 231 covers the back of the first enclosure 210 and that of the third enclosure 230 with a stepped shape. Thereby, the strength of the large shield panel 231 is maintained. In this embodiment, as shown in FIG. 8, the back of the third enclosure 230 has a surface in which a plurality of apertures are formed, as by punching. The punched apertures are small holes having a diameter large enough to prevent radio waves from passing or leaking out of the unit and to prevent external radio waves from penetrating the unit and affecting the board 20, while enabling radiating cooling. Moreover, in this embodiment, the diameter of the small holes is preferably set to 6 mm. However, in consideration of the radiating effect and shielding effect, it is possible to obtain both when the diameter ranges between 4 mm and 7 mm.

The structure of the third unit-storing section 230a is described below in more detail by referring to FIGS. 7 and 8. In FIG. 7, a plurality of terminal-setting holes 232a are formed in the terminal-setting side plate 232 in its longitudinal direction. Terminals 21 closely arranged on the board 20 are fitted to the holes 232a. Moreover, a power supply switch 233a and a power supply outlet 233b are provided for the power supply switch-setting side plate 233 and arranged closely to the board 20. A protective bar 235 for protecting the board 20 is provided and has a reinforcement function for the shield panel 231 and also functions as a guide for mounting board 20 (at the rear of the board 20). In this embodiment, the structure is reinforced by supporting the intermediate position of the protective bar 235 with a support member 236 provided on the board 20.

Moreover, in this embodiment, the board 20 is mounted so as to orient the wiring surface toward the side facing the planar portion 221 and the various element surfaces toward the side exposed in FIG. 7. To use a plurality of boards, instead of the single one shown, it is also possible to mount a leg to the board 20 or to use a laminated board arrangement structure such as a two-layer structure through the terminal-setting side plate 232 or the protective bar 235.

As shown in FIG. 7, with the shield panel removed, it is possible to expose the third unit-storing section 230a and the first unit-storing section 210a. Therefore, convenient maintenance is ensured. Moreover, because the back stands upright with respect to a table surface, maintenance operations can be performed only by removing the back case 1020 and the shield panel 231 without laying the thin display unit 1 flat for such operations. Moreover, when the maintenance is completed, it is possible to mount the shield panel 231 using the protective bar 235 as shown in FIG. 8. Therefore, it is possible to decrease the possibility that the shield panel 231 contacts and damages the board 20.

Moreover, in this embodiment, as shown in FIGS. 7 and 8, the front case 1010 can be mounted to the second enclosure 220, and a mounting plate 224 can be provided for reinforcement at the four corners at the back of the planar portion 221. Also, a mounting portion 225 can be formed flush with the planar portion 221 by cutting and bending the margin 222. A protrusion provided with a tapped hole extending outwardly from the planar portion 221 is formed on the mounting plate 224 and a tapped hole is formed on the mounting portion 225. Further, the fixing rib of the front case 1010 is provided for the position corresponding to the mounting plate 224 and the mounting portion 225. Still further, as shown in FIG. 9, a tapped hole 1021 for mounting is formed at the position corresponding to the tapped hole of the mounting plate 224.

In this embodiment, the front case 1010 is first mounted to the second enclosure 210 by a not-illustrated screw through the mounting portion 225. Then, it is possible to screw in mounting plate 224 through the tapped hole 1021 of the back case 1020 by holding it between a fixing rib (not shown) of the back case 1020 and the fixing rib of the front case 1010.

In FIG. 2, a wiring cover 1031 is removably mounted to the back cover 1020 at one side of the back cover 1020. The specific structure is described by referring to FIGS. 8 and 9. First, in FIG. 8, the third enclosure 230 is mounted to the second enclosure 220 at one side from the enclosure 220 so that the third enclosure 230 and a wiring space 1031 (virtual space shown by a dotted line) are arranged in parallel. In the third enclosure 230, the connecting terminal 300 is mounted in a position adjacent to the wiring space 1031. The specific structure is described below by referring to FIG. 9.

FIG. 9 shows the wiring cover 1030 removed from the thin display unit 1. In this embodiment, one side 1022 of the back case 1020 serves as the inside of the wiring space 1031 and is formed in a shape outlining the first enclosure 210, second enclosure 220, and third enclosure 230. Also, the wiring cover 1030 is mounted so as to cover the one side 1022, and the back of the thin display unit 1 is formed into a shape having right and left symmetry so that the outline of the wiring cover 1030 for covering the outside of the wiring space 1031 becomes the same as the shape of the other side 1023 of the back case 1020. Thereby, the wiring space 1031 is formed between the one side 1022 of the back cover 1020 and the inner wall of the back cover 1030.

Moreover, the connecting terminals 300 are mounted to face the one side of the back cover 1020; and a recess 1032 shown by a dotted line is provided that is open to wiring space 1031. Thereby, wiring space 1031 is formed for accommodating a connector mounted to the connecting terminal 300 to the lower side of the body 1000.

As shown in FIG. 9, the wiring cover 1030 has protrusions 1033 that fit in positioning holes 1024 formed on the back case 1020 and preferably a fixing rib (not shown) is provided for the inner wall of the other side of the wiring cover 1030 and further is removably mounted to the fixing rib 1026 provided for the back case 1020 by using the elasticity of the material (resin) so as to fit to the fixing rib 1025.

According to the above structure, it is possible to greatly expose the wiring connecting terminal 300 by removing the wiring cover 1030. Therefore, connections are made conveniently. Moreover, by simply mounting the wiring cover 1030 to the fixing rib, it is possible to conceal the connecting terminals 300 and allow a connection cord to extend downward along the back of the thin display unit to the inside of the wiring cover 1030. Furthermore, because the back shape of the thin display unit 1 is formed symmetrically to the right and left, it is possible to store the wiring space 1031 in the body 1000 without adversely affecting the appearance of the unit.

In FIG. 2, the stand 2000 is shown to have a base portion 2010 made of a thick iron plate, a resin-molded top case 2020 for covering the upper side of the base portion 2010, and a tilt mechanism section 400. One end of the tilt mechanism 400 is exposed through an aperture 2021 at the upper side of the top case 2020. The tilt mechanism section 400 is provided along the lateral width direction of the body 1000 and has a pair of first support portions 401, the ends of which are mounted to the base portion 2010 through a mount 402. A second support portion 410 is mounted to the bottom of the first enclosure 210 through a mount 411 (see FIG. 1). The ends of a pair of arms 412 are provided for the second support portion 410, and a support body 420 rotatably supports one end of the first support portion 401 along the axis P1. The support body 420 is provided with a spring so that rotations of the arms 412 provided for the first support portion 401 and second support portion 410 are balanced and held at a predetermined position. Thereby, the body 1000 can be tilted in a range from approximately 5 forward to approximately 20 backward.

Preferably, the mount 411 is removably mounted to the first enclosure 210 and the second support body 410 by screws. As shown in FIG. 1, mount 411 is mounted to the first enclosure 210 to be flush with the bottom of the body 1000 or so as not to protrude from the bottom. Thereby, even if the stand 2000 is removed from the body 1000, it is possible to directly set the body 1000 on a flat surface because the bottom of the body 1000 is formed flat. Also, preferably, since the body 1000 is formed into a stable shape whose lower sectional area is larger than its upper sectional area, it is possible to stably mount the body 1000. Moreover, it is possible to connect various types of stands such as a height-adjustable stand and a longitudinally-movable stand through screws.

Figure 3A:
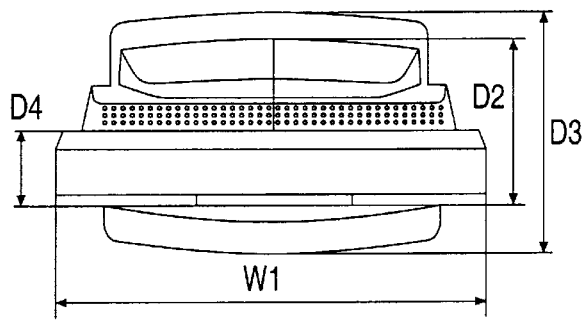
FIGS. 3(a) to 3(d) are top, front, side and back views, respectively, of the LCD shown in FIG. 1.
Figure 3B:
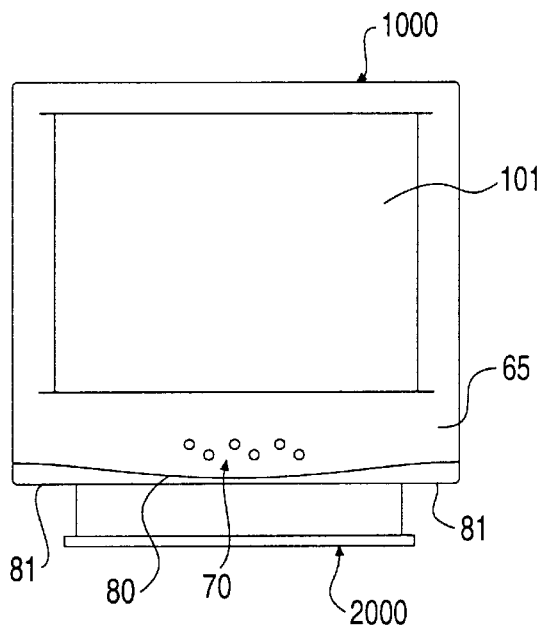
Figure 3C:
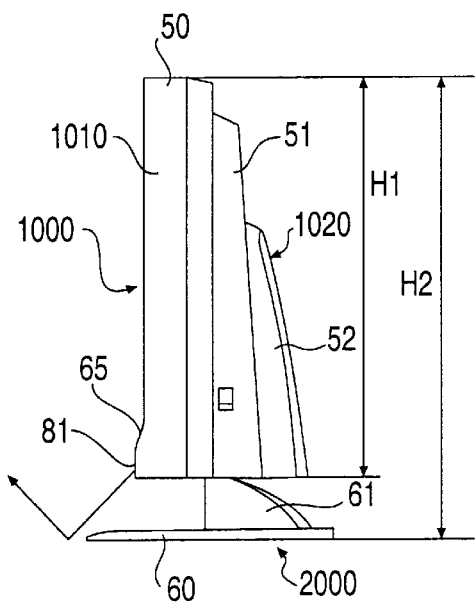
Figure 3D:
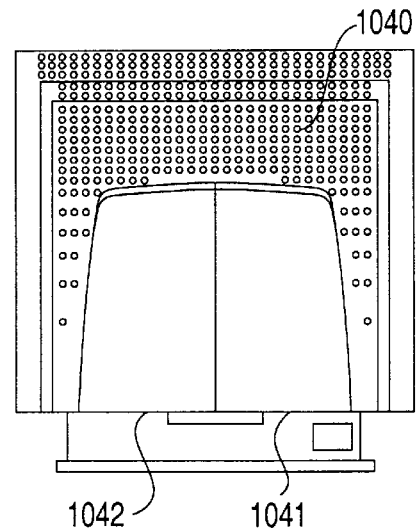

The preferred shape of the LCD 1 of this embodiment is shown in FIGS. 3(a)–3(d), wherein FIG. 3(a) shows a top view, FIG. 3(b) shows a front view, FIG. 3(c) shows a right side view, and FIG. 3(d) shows a back view of the LCD.

The views of FIGS. 3(a)–3(d) show a basic shape of the body 1000 of the LCD 1, which has a housing 50 having a small depth dimension; a thin housing 51 smaller than the housing 50 and provided below the back of the housing 50; and a housing 52 smaller than the housing 51 and provided below the back of the housing 51 and the stand 2000 mounted below the LCD 1. Also shown is a flat plate 60 with a protruded portion 61 formed behind the plate 60. The body 1000 forms the housing 50 with the front case 1010 and forms the housings 51 and 52 with the back case 1020. That is, the body 1000 according to this embodiment has only a small dead space. Further, high mounting efficiency is achieved by directly using the structure of the chassis 200 as a foundation for the overall shape. Thereby, the housings 51 and 52 are not easily seen from the front even when viewed diagonally from the front. Therefore, it is possible to provide a thin appearance of the housing 50 that is particularly remarkable. Moreover, because the appearance as viewed from the back has a shape that takes a large step, toward the center, it is possible to make the maximum depth dimension of the body 1000 unnoticeable.

In this embodiment, preferably an 18" liquid-crystal unit 100 is used. Further, the preferred dimensions include a lateral width W1 of the body 1000 set to 489 mm, a height H1 set to 440 mm, an upper depth D1 set to 73 mm, and a lower maximum depth D2 set to 187 mm, wherein the overall height H2 is set to 507 mm and the overall depth (depth of stand) D3 is set to 268 mm.

As shown in FIGS. 3(*b*) and 3(*c*), it is preferred that a quadrangular flat portion is left around the display screen 101 and that the lower side of the flat portion is formed into a slope 65 having a bottom end that projects toward the front of the unit. Furthermore, the stand portion 2000 is also preferably formed with a flat portion using a simple plane as the principal plane. As a result, it is possible to improve the visibility of the display screen by reducing the presence of interfering patterns and shapes continuous with the display screen 101 about its periphery.

As also shown in FIGS. 3(*a*)–3(*d*), an operating switch group 70, including a plurality of switches for adjusting the display screen and a power-supply indication lamp, etc., is provided at the center of the sloped portion 65 to make it convenient for a user to manipulate each of the operating switches and to see the indication lamp. Furthermore, a corner cutting (downwardly, inwardly sloping or slanting) surface 80, which at its center is narrow and at its sides is wide, is formed at the bottom end of the sloped portion 65. A sound-release portion 81 having a plurality of small holes is formed at the sides of the corner cutting surface 80. As shown in FIG. 3(*c*), the surface of the sound release portion 81 and the holes are oriented to diagonally downward, so that the sound emitted from the sound-release portion 81, as shown by the arrow, is directed to reflect off the table surface on which the unit is standing and reach the ears of a user by reflection. In this way, it is possible to obtain a preferable sound effect. Further, because sound that is reflected off the table surface diffuses toward the ceiling, it is advantageously not heard so easily by persons other than the user. Moreover, the sound-release portion 81 on the surface 80 cannot be easily seen from the front. Therefore, it is possible to decrease adverse affects on the viewing of the display, even if the sound-release portion 81 is required to be increased in size in consideration of sound efficiency.

The manipulability of the operating switch group 70 is described below by referring to FIGS. 10(*a*)–10(*d*). FIG. 10(*a*) is a layout drawing of the operating switch group 70, FIG. 10(*b*) is a display-screen-adjusting menu window diagram displayed on a display screen, FIG. 10(*c*) is a mounted window diagram of one functional window, and FIG. 10(*d*) is a mounted window of other function.

In FIG. 10(*a*), the operating switch group 70 includes a pair of setting switches (select 71*a* and back 71*b*) and a pair of up-down switches (up 72*a* and down 72*b*) at the center of the body 1000, arranged symmetrically to the right and left. Also included are a a menu switch 73 and an automatic adjustment switch 74 at the sides of the switches 71*a*, 71*b* and 72*a*, 72*b*, arranged symmetrically to the right and left, and further a power-supply lamp 75 and a switching lamp 76 (e.g. energy-saving indication lamp) at both sides of the switches 73 and 74, arranged symmetrically to the right and left. In this embodiment, the switches are mounted so as to perform operations from left to right.

The setting switches 71*a* and 71*b* and the up-down switches 72*a* and 72*b* are diagonally arranged so as to have longitudinal and lateral directivities so it is convenient to perform longitudinal or lateral operations depending on the displayed function being performed as indicated in a window. Moreover, the correlation between selector switches 71*a*, 71*b* and the up-down switches 72*a*, 72*b* can be exhibited by diagonal-pattern graphic indications in a window being displayed so that a functional pair of operating switches can be easily recognized among the plurality of operating switches.

A preferred method for operating the operating switch group 70 is described below by referring to FIGS. 10(*b*) to 10(*d*). First, by pressing the menu switch 73, a menu window 77, as shown in FIG. 10(*b*), is displayed. A plurality of functions (77*a*, 77*b*, 77*c*, . . . ) are vertically displayed in the menu window 77 and the functions can be selected by the up-down switches 72*a*, 72*b*. A highlighted indication showing that a function has been selected moves upward by pressing the up switch 72*a* and the highlighted indication moves downward by pressing the down switch 72*b*. Thereby, the user sees that a switch located at an upper position is an upper switch and a switch located at a lower position is a switch for downward movement.

By pressing the selector switch 71*a* in accordance with a purposed function, it is possible to display the setting window 78 or 79 shown in FIGS. 10(*c*) and 10(*d*), respectively. Moreover, by pressing the back switch 71*b*, it is possible to perform an operation of going back to a previously displayed window, which causes deletion of the menu window 77 in this case.

The setting window 78 shown in FIG. 10(*c*) is selected in accordance with the above operation. The setting window 78 displays a function title 78*a*, an up-function indication 78*b*, and a down-function indication 78*c*. In particular, the up-function indication 78*b* is selected by pressing the up switch 72*a* and the down-function indication 78*c* is selected by pressing the down switch 72*b*. This operation makes it possible to make adjustments in accordance with a selected function. After the adjustments have been made, it is possible to delete the menu window 77 by pressing the back switch 71*b* once to return the screen to the menu window 77 followed by pressing the switch one more time.

Moreover, the function setting window 79 in FIG. 10(*d*) displays a function title 79*a* and a setting bar 79*b* showing that the left side is 0 and the right side is 100. In this example, the setting bar 79*b* moves rightward by pressing the up switch 72*a* and the setting bar 79*b* can be moved leftward by pressing the down switch 72*b*. Thereby, the right and left arrangement of the switches is matched with a corresponding increase/decrease of the setting bar 79. The setting and deleting of the above functions is the same as those for the operations in FIG. 10(*c*).

As described above, convenient manipulation of the switches of switch group 70 is ensured by arranging the switches to correspond with the tasks to be performed as displayed in the windows. In particular, the operating direction of the adjustments to be made with the paired switches that are diagonally arranged together correspond to the longitudinal or vertical and lateral or horizontal directions indicated in the windows that are displayed for the selected functions.

As discussed, in the LCD unit of the present invention, ventilation is preferably provided to remove the heat generated by the internal components, including the display panel, the backlights and the power supply section. As shown in FIG. 3(d), a first ventilation port structure 1040 is provided with a plurality of small holes at the upper side of the back of the body 1000. There is also a second ventilation port structure 1041 and a third ventilation port structure 1042 at the rear along both sides of the bottom of the body 1000 in order to allow internal heat to radiate to the outside of the enclosure. The second ventilation port 1041 is preferably an aperture formed with recess 1032 which the above mentioned connection cord passes through. Further, preferably the third ventilation port 1042, as shown in FIG. 9, has a plurality of small holes formed at a position symmetric to the aperture formed with the recess 1032.

The exhaust structure is described below by referring to FIG. 1. Outside air is taken in through the second ventilation port 1041 and the third ventilation port 1042, and is exhausted through the first ventilation port 1041. That is, air taken in through the second ventilation port 1041 and the third ventilation port 1042 passes through the apertures 211 formed in the sides of the first enclosure 210 and is taken into the first unit-storing section 210a. The air taken in cools the power supply section 10 mounted in the first unit-storing section 210a and thereafter, it is sent into the third unit-storing section 230a by the blower 234 mounted to the top plate 214 of the first enclosure 210. As the air passes through, it cools the board 20 and then is exhausted through the first ventilation port 1040 through an aperture provided in the shield panel 231.

Also, as shown in FIG. 1, air is exhausted from the second enclosure 220. Specifically, air in the second unit-storing section 220a is drawn in by the blower 224 mounted to the upper side of the planar portion 221 and exhausted through the first ventilation port 1040. In this case, the air in the second unit-storing section 220a is supplied from the aperture formed with the mounting portion 225 described with respect to FIG. 7 or other gap to cool the back of the liquid-crystal unit 100 and the inverter board 103. Such cooling air is then exhausted through the above route.

An electromagnetic-wave shielding structure is described below by referring to FIGS. 1 and 8. In this embodiment, as described later, the exterior of the liquid-crystal unit 100 (shown in FIG. 4) is formed with a conductive material. Therefore, by providing the liquid-crystal unit 100 for the second unit-storing section, it is possible to form the thin-box shaped second unit-storing section 210a with a conductive characteristic ensured by the planar portion 221, margin 222, and the exterior of the liquid-crystal unit 100. Further, by storing various units in the first enclosure 210, second enclosure 220, and third enclosure 230, each respectively formed of a conductive material, it is possible to reduce the influence of leakage of electromagnetic waves generated by the internal components on the human body and to prevent the influence of electromagnetic waves on the components from the outside. Moreover, in this embodiment, by using the planar portion 221 of the second enclosure 220 for separating the first unit-storing section 210a, second unit-storing section 220a, and third unit-storing section 230a from each other and the apertures 216, 217, 223, and 225 for connecting each enclosure to the top plate 214 of the first enclosure 210, it is possible to perform ventilation and provide sufficient space for main wiring connections in the chassis 200 in consideration of the objective to maintain shielding of electromagnetic waves such as radio waves. Therefore, it is possible to further ensure the radio-wave shielding effect of the chassis 200.

In particular, the liquid-crystal unit 100 of this embodiment may generate strong electromagnetic waves from the cord connecting the inverter 103 mounted to the back of the unit 100 with the liquid-crystal unit 100. However, because the inverter 103 and the liquid-crystal unit 100 are stored in the thin-box shaped second unit-storing section 210a, which is conductive or has a conductive characteristic, it is possible to shield them from the outside. Therefore, this embodiment is provided with a cover formed with a conductive material to be described later in order to shield the inverter 103 by considering that various types of components may be used in the actual construction. When using the above structure, it is unnecessary to use the cover 104 under normal usage. However, it is better to use the cover 104 when strict shielding is necessary.

Figure 4:
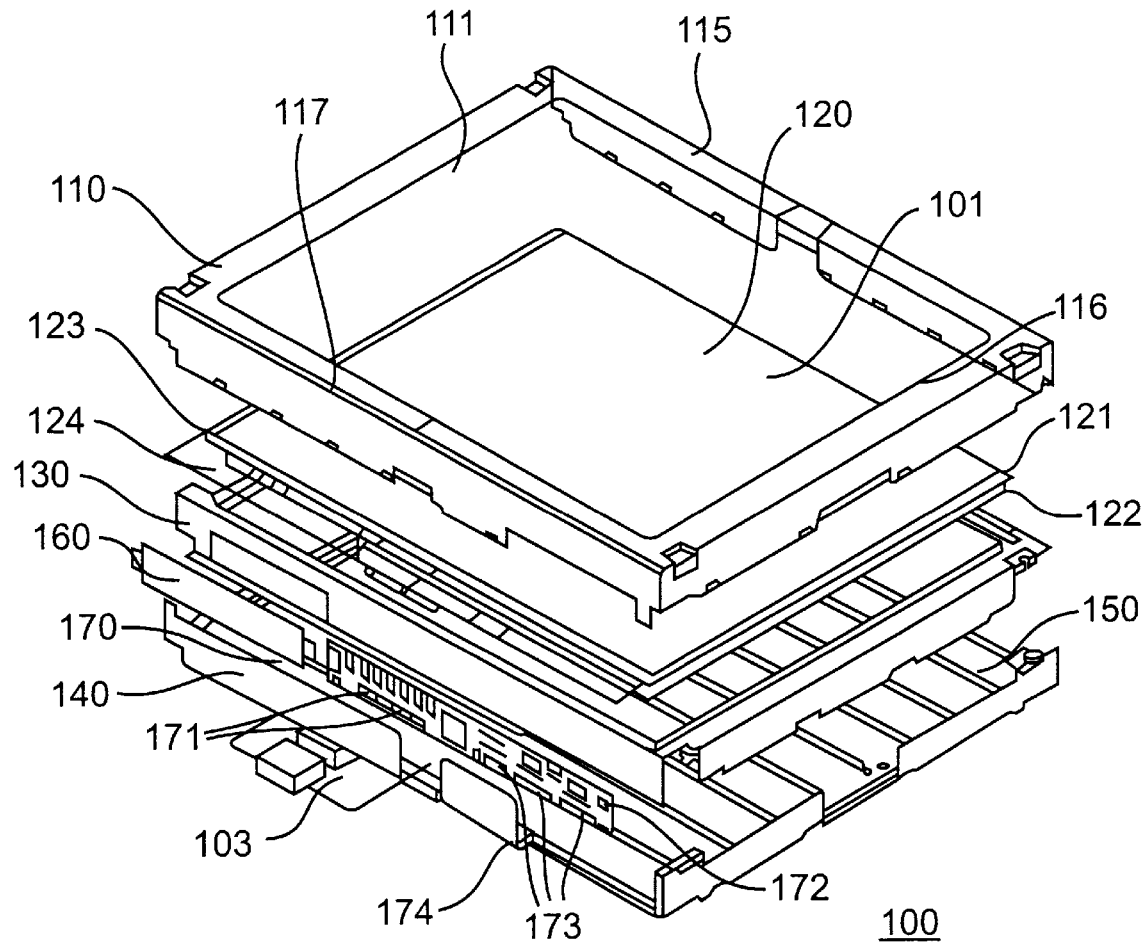
FIG. 4 is an expanded perspective view of the liquid-crystal unit 100 of the LCD shown in FIG. 1.
Figure 5:
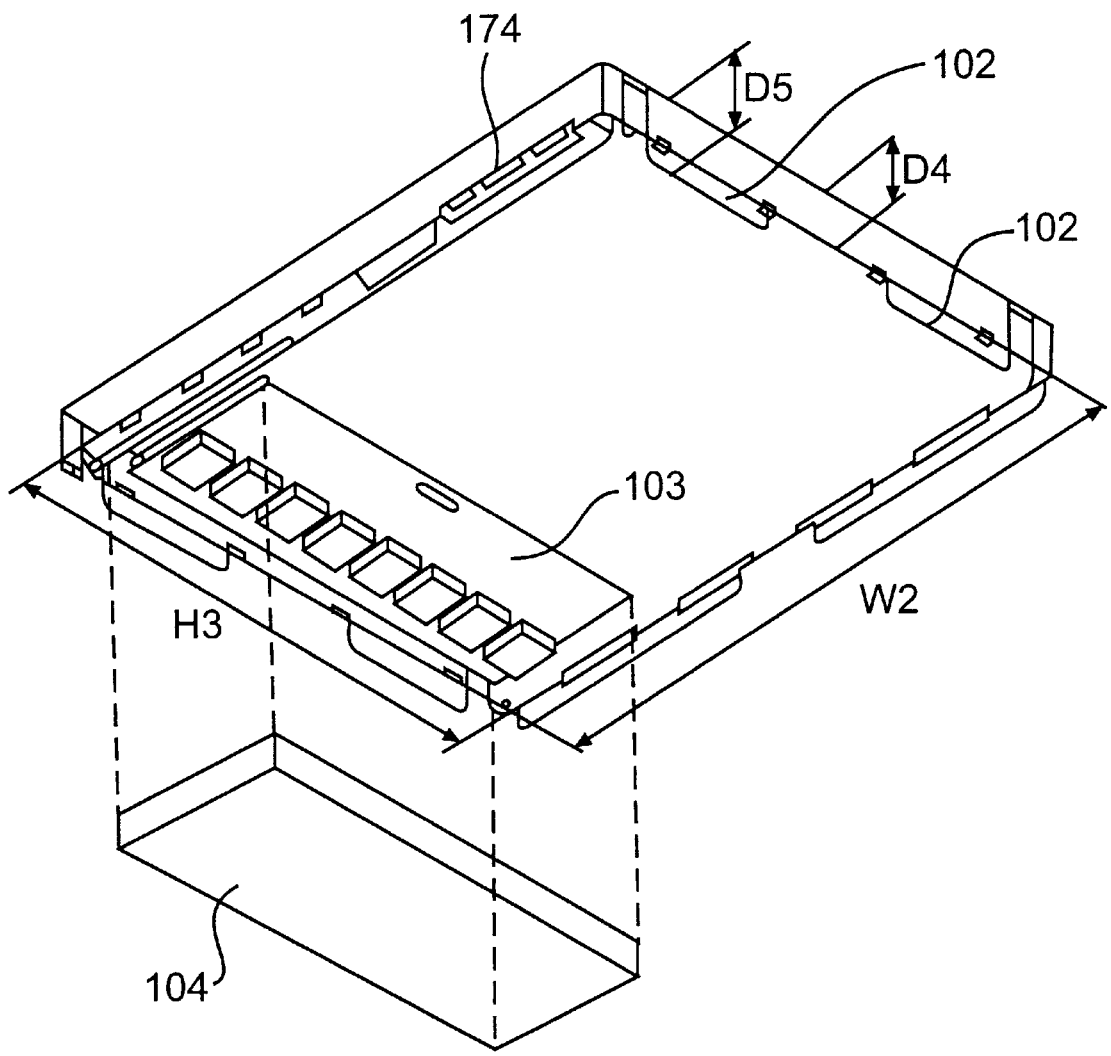
FIG. 5 is a rear perspective view of the liquid-crystal unit of the LCD of the present invention shown in FIG. 1.
Figure 6A:
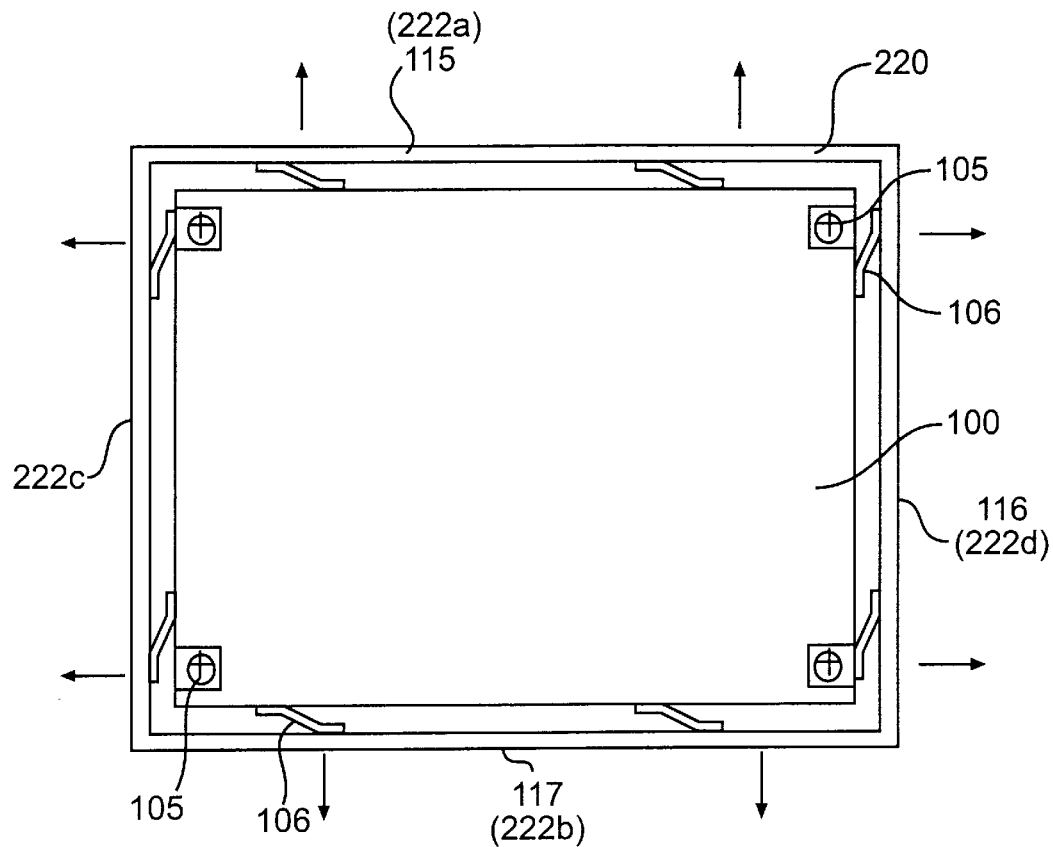
FIGS. 6(a) and 6(b) are diagrams showing the mounting of the liquid-crystal unit of the LCD shown in FIG. 1.
Figure 6B:
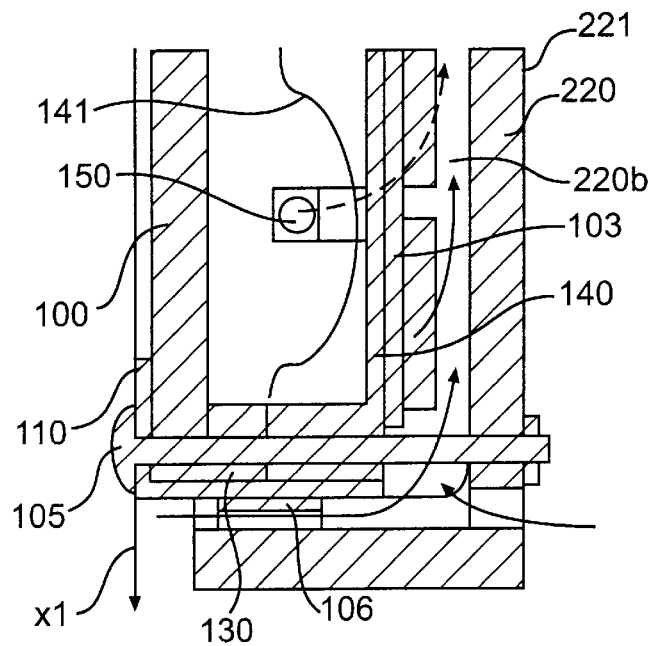

The liquid-crystal unit 100 is described below in detail by referring to FIGS. 4 to 6. FIG. 4 is a diagram of parts of the liquid-crystal unit 100; FIG. 5 is a perspective view of the rear of a liquid-crystal unit; and FIGS. 6(a) and 6(b) are mounting arrangement diagrams of a liquid-crystal unit, in which FIG. 6(a) is a front view and FIG. 6(b) is a representative sectional view.

In FIG. 4, as described above, the liquid-crystal unit 100 according to this embodiment has a high-image-quality TFT LCD module having an 18" screen using thin-film transistor TFT technology. In this case, as shown in FIG. 4, the liquid-crystal unit 100 is mounted to the LCD 1 by orienting a side 115 as an upper side. Subsequent description is made by assuming the upper side 115 is so oriented.

The liquid-crystal unit 100 is preferably constructed by laminating a top frame (metallic frame) 110 formed with a metallic plate, a liquid-crystal panel 120, a middle frame made of resin, and a bottom frame made of conductive aluminum to each other. The top frame 110 has a display window 111 for exposing the display screen 101 of the liquid-crystal panel 120 at its center and moreover has a side wall at its circumference to fix the liquid-crystal unit 100 by enclosing the middle frame 130 and bottom frame 140 and fitting a pawl provided at an end of the side wall into the recess of the circumferential wall of the bottom frame.

The liquid-crystal panel 120 has a gate driver 121 and a gate FPC 122 at its one minor side 116 and has a drain driver 123 and a drain FPC 124 at its bottom side 117. Moreover, the surface of the display screen 101 of the liquid-crystal panel 120 is provided with a transparent sheet coated with a conductive material. Thereby, if a hand charged with static electricity touches the display screen 101, it is possible to discharge the static electricity through the peripheral top frame 110. Furthermore, this structure makes it possible to cover the front of the liquid-crystal unit with a conductive material.

The middle frame 130 has a frame-like shape formed with the peripheral wall surface to keep a constant distance between a fluorescent lamp 150, functioning as a backlight, and the liquid-crystal panel 120.

The bottom case 140 is formed with a peripheral wall surface and a bottom wall that become parallel with the planar portion 221, in which a plurality of fluorescent lamps 150 are arranged so as to be parallel with the plane of the liquid-crystal panel 120. This structure is described by referring to FIG. 6(b).

FIG. 6(b) is a representative longitudinal sectional view showing the mounting of the liquid-crystal unit 100 to the second enclosure 220. Though not illustrated in FIG. 4, a corrugated reflector 141 reflecting toward the liquid-crystal panel 120 is mounted in the bottom case 117 corresponding to each fluorescent lamp 150. Moreover, the fluorescent lamp 150 is secured to the center of the surface of the corrugated circular arc. In this case, the fluorescent lamp 150 is mounted at its ends and supported by an insulating material, such as rubber for electrically separating the fluorescent lamp 150 from the reflector 141 and the bottom case 140. Moreover, though not illustrated, a plurality of heat-radiating ventilation ports are provided for the bottom case 140.

Though the reflector 141 is directly mounted in the bottom case 140 in FIG. 6(b), it is preferable to mount the reflector 141 in the bottom case 140 by forming the reflector 141 into a unit. In this case, it is preferable to mount the reflector 141 in a thin box shaped case that opens toward the liquid-crystal panel 140 so as to cover the case and to mount the fluorescent lamp 150 to each front of the corrugated shapes of the reflector 141 so that the reflector 141 is located in the box shaped case. It is further preferable to mount the rubber for supporting the lamp to the box shaped case. The above structure makes maintenance easy because the above unit may be replaced in its entirety when replacing the fluorescent lamp 150.

In this embodiment, the fluorescent lamp 150 is vertically mounted in parallel with the upper side 115. Thereby, when the fluorescent lamp 150 is mounted to the LCD 1, the ends of the fluorescent lamp 150 which produce the greatest amount of heat are vertically arranged at both sides of the liquid-crystal unit 100. Therefore, as shown in FIG. 6(b), the heat produced by the ends of the fluorescent lamp 150 are radiated upward along the sides of the liquid-crystal unit 100. Thus, it is possible to reduce the influence of the heat that is generated on the display screen 101, which is located in the middle, between the ends of the fluorescent lamp 150.

The third enclosure 230 is mounted by leaving a flat portion at its sides. The flat portions at the sides coincide with the positions of the ends of the fluorescent lamp 150. Therefore, because the board 20 is located at the center, separate from the portion producing the most heat, it is possible to reduce the effect of the heat that is produced.

Furthermore, because in this embodiment a large liquid-crystal panel 120 is used, the fluorescent lamps 150 are also increased in length. Therefore, a high voltage and high frequency are required to ensure proper discharge of the long fluorescent lamps 150. Moreover, because this embodiment uses a high-resolution liquid-crystal panel 120, a large number of fluorescent lamps 150 are arranged inside. These fluorescent lamps 150 produce much heat and generate substantial electromagnetic waves. In this embodiment, the bottom case 140 is made of conductive aluminum in order to achieve the electromagnetic wave shielding object as described above. Thereby, it is possible to disperse the heat produced inside by the bottom case 140. Furthermore, because it is possible to enclose the exterior of the liquid-crystal unit 100 with the bottom case 140 and top case 10 made of a conductive material and the display screen 101 covered with a conductive transparent sheet, it is possible to reduce the influence of the electromagnetic waves.

In FIG. 4, a DC/DC converter 160 and a TCON (TFT controller) board 170 having a width slightly smaller than the thickness of the liquid-crystal unit 100 and stored in the enclosure of the liquid-crystal unit 100 are arranged on the bottom side 117 of the liquid-crystal unit 100. The TCON board 170 functions as a medium for connecting the liquid-crystal panel 120 with an external unit, which is provided with a drain FPC (Flexible Printer Connector) linkage connector 171 connected with the drain FPC 124, a gate FPC linkage connector 172 connected with the gate FPC 122, and an I/F (Interface) connector 173 for connection with an external unit. A recess 174 is formed at a position corresponding to the I/F connector 173 of the liquid-crystal unit 100, which connects with an external connector.

In FIG. 5, as described above, the inverter 103 is mounted to the back of the liquid-crystal unit 100 through a screw or the like. Moreover, the inverter 103 is covered with a cover 104 made of a conductive material. Furthermore, the inverter 103 is connected to the fluorescent lamp 150 through a cord to supply high-voltage (1,000 V), high-frequency power. According to the above structure, because the inverter board 103 is mounted to the bottom case 140, which is made of aluminum having a high heat conductivity by closely contacting the case 140, it is possible to radiate the heat produced by the inverter board 103 through the bottom case 140. Therefore, it is possible to reduce adverse effects caused by the concentration of heat.

As shown in FIG. 5, protrusion 102 is formed on the back of the liquid-crystal unit 100, as described above. Though the protrusion 102 is formed from the peripheral wall of the top frame 110, it is also possible to form a protrusion on the back of the bottom frame 140. Moreover, in this embodiment, the bottom right side is mounted as the top side 115 as shown in FIG. 5, and the lateral width W2 of the liquid-crystal unit 100 when mounted is set to 415 mm, its height H3 is set to 330, the depth D4 of its body is set to 35 mm, and the depth D5 including the protrusion 102 is set to 45 mm.

FIG. 6(a) is a schematic front view of the liquid-crystal unit 100 mounted to the second enclosure 220. The liquid-crystal unit 100 is mounted to the second unit-storing section 220a by a screws 105 provided at the four corners of the liquid-crystal unit 100. As shown in FIG. 6(b), each screw 105 is mounted to the planar portion 221 of the second enclosure 220 by passing through the liquid-crystal unit 100. Also, a buffering or shock absorbing member 106 is mounted between the side wall around the liquid-crystal unit 100 and the inner wall surface of the margin 222 of enclosure 220. The buffering member makes it possible to stably mount the liquid-crystal unit 100 in a predetermined position of the second unit-storing section 220a and disperse any stress applied to the second enclosure 220 in the direction of the arrow X1 shown in FIG. 6(b). Particularly, in the case of the large high-resolution liquid-crystal unit 100 used for this embodiment, because the liquid-crystal unit 100 has a large weight, it is possible to completely support the load of the unit's weight, which acts in the direction of the arrow X1 by the above structure. Moreover, the above structure protects the liquid-crystal unit 100 from horizontal and vertical shocks applied to the unit 100 during transportation.

It is also possible to form the buffering member 106 with a soft material such as rubber or to electrically connect the liquid-crystal unit 100 with the second enclosure 220 by forming the member 106 with a flat spring. Therefore, it is possible to discharge to earth the static electricity applied to the liquid-crystal unit 100 through the second enclosure 220.

Furthermore, although the gap between the liquid-crystal unit 100 and the margin 222 is shown to be large for the sake of explanation, it is possible to reduce the amount of electromagnetic waves passing through the gap by making the size of the gap equal to the size of the small holes formed in the shield panel 1020.

When a buffering member 106 is not used, it is also possible to form a protrusion on the periphery of the liquid-crystal unit 100 for the same purpose. Moreover, when the protrusion is not formed, it is necessary to bring the bottom (bottom side 117) of the liquid-crystal unit 100 into close contact with the bottom margin 222b of the margin 222 of the second enclosure 220. Thereby, it is possible to uniformly support the load of the weight of the unit in the direction of the arrow X1 by the bottom margin 222b and support the load by the second enclosure 220 as a whole.

Second Embodiment

FIGS. 11(a) to 11(d) are external views of an LCD body 3000 and stand 4000 of a second embodiment of the thin display unit of the present invention. FIG. 11(a) shows a top view, FIG. 11(b) shows a front view, FIG. 11(c) shows a right side view, and FIG. 11(d) shows a back view of the LCD.

The LCD body 3000 of this embodiment has a back formed so as to be in a convex circular-arc tapering toward the upper side. Therefore, it can be easily cleaned. With respect to this embodiment, the structure of the chassis 200 and the arrangement of the internal components and enclosures are the same as those of the first embodiment, so further description thereof is omitted.

As shown in FIGS. 11(a)–11(d), a front case 3010 is provided for covering the front of the body and a back case 3020 for covering the rear of the body. This embodiment is different from the first embodiment in that the shape of the back case 3020 is formed into a large circular-arc shape.

Specifically, the center of the rear of the upper-side, shaped as shown in FIG. 11(a) extends rearwardly and the sides are formed into a curved surface having a large convex circular arc. The bottom of the back, as shown in FIG. 11(b) extends rearwardly the most to provide the greatest depth dimension. Toward the top end of the back, the depth decreases. A large convex curved shape results from the top to the bottom of the back.

Because this structure makes it possible that the appearance of the back is slowly narrowed toward the upper side, it is possible to obtain the same advantage as that provided by the first embodiment, in which the bottom of the body 3000 is stable. It is also possible to ensure that cleaning of the covers is convenient because the entire back is formed in a uniform shape (not stepped). Moreover, because the back is partially dome shaped, it is strong structurally. Therefore, it is possible to decrease the number of reinforcement ribs causing ridges. Furthermore, in this embodiment, a first ventilation port structure 3040 is formed by providing a plurality of vertical slits instead of holes. The third ventilation port structure 3042 can also be similarly formed from slits or holes. Therefore, it is possible to obtain an opening ratio larger than that of the ventilation port structure formed from a plurality of holes. Further, the ventilation ports of this embodiment can be easily molded. On the other hand, the ventilation port structure 3041 is substantially similar to the second ventilation port 1041 of the first embodiment.

As another difference with respect to the first embodiment, the corner cutting surface 3080 at the front along the bottom of the unit is formed into a stepped shape (rather than slanted) that extends to the sound boards 3081 along the sides. However, the switch group 3070 is substantially unchanged with respect to the first embodiment. Furthermore, in this embodiment, the stand 4000 has a different, more compact shape formed with the upper side of the base portion 4010 being in the shape of a circle. As constructed, the stand is stable and supports the unit despite the modified stand construction with respect to the first embodiment.

Third Embodiment

The third embodiment of the present invention is described below by referring to FIG. 12. FIG. 12 is a central longitudinal sectional view of a liquid crystal display 500 mounted on a stand 6000. The same reference numbers as used in FIG. 1 are used in this figure to denote the same components.

The liquid crystal display of this embodiment has a front case 5010 and a back case 5020 mounted on a chassis that has a horizontal first enclosure 5210 having a height dimension larger than its depth dimension. The chassis also has a vertical second enclosure 5220 located at the front of the first enclosure 5210 that has a wide planar portion 5221 extending in the longitudinal direction, and a vertical third enclosure 5230 located above the rear of the upper side of the first enclosure and behind the second enclosure 5220.

In this embodiment, the power supply section 10 is set in the longitudinal direction in the first enclosure 5210, which has an L-type cross-sectional shape preferably formed in a similar manner as in the first embodiment by bending an iron plate. A first unit-storing section 5210a is provided for storing the power supply section 10 in a vertical orientation at the rear of the first unit storing section.

As shown in the third embodiment, the front of the upper side of the first enclosure 5210 is formed lower than its rear part. Thus, there is a stepped portion 5215 that supports the bottom end of the second enclosure 5220, between the front and the rear portions of the enclosure. In this embodiment, the stepped portion 5215 is formed larger than in the first and second embodiments. Therefore, the second enclosure 5220, which has a heavy weight load, is firmly supported and convenience of assembly is ensured as a result.

The second unit-storing section 5220a opens forward as in the first embodiment and has a margin 5222 in which is mounted vertical liquid-crystal unit 100. The third enclosure 5230 has a third unit-storing section 5230a for storing a vertical board 5020 for driving and controlling the liquid-crystal unit 100 and also for serving various interface functions.

Air movement internally among the enclosures is similar in this embodiment to that provided in the first embodiment. The first enclosure 5210 has wall surfaces formed by bending the bottom plate, which have a plurality of apertures 5211 formed therein. An exhaust fan 5234 is mounted on top of the rear part of the enclosure to cause air to flow upward through the third enclosure 5230. A space 5220b is formed between the back of the liquid-crystal unit 100 and the planar portion 5221 that provides mounting space for inverter board 103 set at the back of the liquid-crystal unit 100. Also, space 5220b serves as a wiring space for the liquid-crystal unit 100 and the inverter board 103, a space for storing extra wiring, or a route for radiating the heat produced by the liquid-crystal unit 100 and inverter board 103. Also, an aperture 5223 is formed in the upper side of the wide portion 5221 of the second enclosure 5220 for radiating the heat produced in the second unit-storing section 5220a.

The overall shape of the body 5000 is similar to that of the second embodiment and is mounted on the stand 6000 through mounting plate 5411. As in the first embodiment, the stand has a tilting mechanism 6400. Further, in this embodiment, the third unit-storing section 5230a is formed so that it becomes gradually deeper from the upper side toward the lower side. Moreover, it is possible to decrease the depth of the first unit-storing section by longitudinally setting the power supply section 10 to the first unit-storing section 5210a. Therefore, it is possible to decrease the depth of the lower side of the liquid crystal display and thereby decrease the overall depth dimension of the unit.

According to each of the three embodiments of the present invention, it is possible to provide overall strength, air permeability, and radio-wave shielding in a thin display unit by using the chassis 200 constituted with the above three enclosures. Moreover, as described in the first and second embodiments, it is possible to form an outer case, particularly a back case 1020, into various shapes, each of a thin type. Furthermore, because it is easy to form the bottom of the body to be flat, it is possible to set the unit on a flat surface without using the stand.

As described, each of the embodiments uses a structure having three enclosures. However, it is possible to decrease a power-supply section or board in size by constituting a chassis with the second and third enclosures, providing the power-supply section and the board for the third enclosure, and supporting a tilt mechanism section at the lower side of the back of the second enclosure. Thereby, it is possible to provide a compact thin display unit having a large display screen. Moreover, it is possible to provide a compact thin display unit having a thinner body and a large display screen by constituting a chassis with the second and third enclosures, supporting a tilt mechanism section at the lower side of the back of the second enclosure, and setting a power supply section to a stand.

Although each of the above embodiments is described in accordance with an LCD having a backlight, it is also possible to obtain the same advantage from a thin display unit such as a plasma display unit.

According to the present invention, a compact thin display unit is made thin while maintaining the strength of the enclosure for supporting the display section. Furthermore, as shown by the above embodiments, by setting a power supply section to a body section rather than the stand, it is possible to easily remove the body from the stand. Therefore, convenience in assembly and maintenance of the unit is ensured, according to the objects of the invention.

While preferred embodiments have been set forth with specific details, further embodiments, modifications and variations are contemplated according to the broader aspects of the present invention, all as determined by the spirit and scope of the following claims.

What is claimed is:

1. A thin display unit, comprising:
    a body extending longitudinally having height and width dimensions that are greater than a depth dimension of the body, a first enclosure at a bottom portion of the body, a second enclosure in front of a portion of the first enclosure having a planar portion extending in the longitudinal direction, and a third longitudinally extending enclosure located above a rear portion of the first enclosure and behind the second enclosure;
    a power supply section stored in the first enclosure,
    a thin display section mounted in the second enclosure in front of the planar portion of the second enclosure, and
    a vertical substrate having components for operating said thin display unit that is stored in the third enclosure,
    wherein the second enclosure has an opening that opens toward a front of the body and a margin along the perimeter of the opening, and wherein the thin display section is fixed to the margin.

2. A thin display unit according to claim 1, further including a shock buffer mounted between the margin and the thin display section.

3. A thin display unit according to claim 2, wherein the shock buffer is one of a resilient material and a spring.

4. A thin display unit according to claim 1, wherein the thin display section is a liquid-crystal display provided with at least one backlight.

5. A thin display unit according to claim 4, wherein a plurality of the backlights are mounted at a side facing a display screen section of the liquid-crystal display in parallel with the display screen section.

6. A thin display unit according to claim 1, further including a stand for supporting the body that is mounted to the first enclosure, said stand having a base section and a tilt mechanism section for supporting the body so that the body can be tilted by the tilt mechanism.

7. A thin display unit, comprising:
    a body extending longitudinally having height and width dimensions that are greater than a depth dimension of the body, a first enclosure at a bottom portion of the body, a second enclosure in front of a portion of the first enclosure having a planar portion extending in the longitudinal direction, and a third longitudinally extending enclosure located above a rear portion of the first enclosure and behind the second enclosure;
    a power supply section stored in the first enclosure,
    a thin display section mounted in the second enclosure in front of the planar portion of the second enclosure, and
    a vertical substrate having components for operating said thin display unit that is stored in the third enclosure,
    an air route formed between the third enclosure and the planar portion of the second enclosure,
    wherein the second enclosure has an opening that opens toward a front of the body and a margin along the perimeter of the opening and the thin display section is fixed to the margin, and
    wherein an air route is formed between the thin display section and the planar portion of the second enclosure.

8. A thin display unit according to claim 4, further including:
    an upper side of the first enclosure having a first aperture and a first fan mounted adjacent the aperture for promoting air flow from the first enclosure to the third enclosure, a second aperture at an upper side of the planar portion of the second enclosure and a back case covering a rear of the body and having an exhaust port formed on the upper side of the back case for exhausting the heat passing through the first and second apertures to outside of the body.

9. A thin display unit according to claim 5, further including a second fan mounted adjacent said second aperture for promoting air flow through said second enclosure.

10. A thin display unit comprising:
    a body extending longitudinally having height and width dimensions that are greater than a depth dimension of the body, a first enclosure at a bottom portion of the body, a second enclosure in front of a portion of the first enclosure having a planar portion extending in the longitudinal direction, and a third longitudinally extending enclosure located above a rear portion of the first enclosure and behind the second enclosure;
    a power supply section stored in the first enclosure,
    a thin display section mounted in the second enclosure in front of the planar portion of the second enclosure, and
    a vertical substrate having components for operating said thin display unit that is stored in the third enclosure,
    wherein the third enclosure has a third unit-storing section arranged by having a wiring space between the third enclosure and the planar portion of the second enclosure to store a vertical substrate, wherein the third enclosure is arranged to deviate to one side from the second enclosure so that the wiring space and the third enclosure are in parallel with each other, and further including a connecting terminal at the wiring space side, a back case covering the wiring space and opening downwardly, and a removable wiring cover concealing the connecting terminal.

* * * * *